(12) United States Patent
Regen et al.

(10) Patent No.: US 11,548,573 B1
(45) Date of Patent: Jan. 10, 2023

(54) JACKKNIFE PREVENTION APPARATUS

(71) Applicants: David M Regen, Nashville, TN (US);
Ingrid L Regen, Sudbury, MA (US);
Samuel M Regen, Fairfield, CA (US)

(72) Inventors: David M Regen, Nashville, TN (US);
Ingrid L Regen, Sudbury, MA (US);
Samuel M Regen, Fairfield, CA (US)

(*) Notice: Subject to any disclaimer, the term of this patent is extended or adjusted under 35 U.S.C. 154(b) by 12 days.

(21) Appl. No.: 17/713,425

(22) Filed: Apr. 5, 2022

Related U.S. Application Data

(60) Provisional application No. 63/235,250, filed on Aug. 20, 2021.

(51) Int. Cl.
*B62D 53/08* (2006.01)

(52) U.S. Cl.
CPC .................. *B62D 53/0871* (2013.01)

(58) Field of Classification Search
CPC .............. B62D 53/068; B62D 53/0857; B62D 53/0871; B62D 63/08
See application file for complete search history.

(56) References Cited

U.S. PATENT DOCUMENTS

| | | | | |
|---|---|---|---|---|
| 2,499,013 A | * | 2/1950 | Wood ................. | B62D 53/0878 280/432 |
| 2,714,017 A | * | 7/1955 | Mendez ............. | B62D 53/0871 280/476.1 |
| 2,815,224 A | * | 12/1957 | Waters, Jr. ......... | B62D 53/0871 280/433 |
| 2,918,309 A | * | 12/1959 | Cellucci ............. | B62D 53/0871 280/DIG. 14 |
| 3,102,646 A | * | 9/1963 | Clejan .................... | B61D 3/184 414/800 |
| 3,587,882 A | * | 6/1971 | Friday et al. .......... | B62D 53/02 414/544 |
| 3,730,555 A | * | 5/1973 | Keller ................ | B62D 53/0871 280/432 |
| 3,774,941 A | * | 11/1973 | Durr .................. | B62D 53/0878 280/432 |
| 3,909,044 A | * | 9/1975 | Henzel ...................... | B60T 7/20 188/112 A |
| 3,917,314 A | * | 11/1975 | Neal ................... | B62D 53/0871 280/432 |
| 4,068,860 A | * | 1/1978 | Meyers .............. | B62D 53/0878 280/432 |

(Continued)

*Primary Examiner* — Tony H Winner
*Assistant Examiner* — Maurice L Williams

(57) ABSTRACT

A jackknife prevention apparatus configured to be mounted intermediate the trailer and cab of a tractor-trailer rig extending bilaterally wing-like from the tractor's frame rails to which it is hinged horizontally. The jackknife prevention apparatus can swing up or down on its hinge between lowest and highest positions by action of a motor which responds to tractor conditions so as to promote safety, maneuverability and convenience. Specifically, when the tractor is parked, the apparatus tilts down near the ground and constitutes a stairway from ground up to the frame-rail tops. When the tractor is unparked, the apparatus swings up to near horizontal, where it is inactive. If tractor speeds exceed perhaps 20 or 30 mph, the apparatus rises to its highest position where it blocks further nearing of a trailer's front corner to the tractor's cab at a tractor-trailer angle of perhaps 15 to 20 degrees, thereby preventing a jackknife accident.

1 Claim, 6 Drawing Sheets

(56) References Cited

U.S. PATENT DOCUMENTS

| | | | | | |
|---|---|---|---|---|---|
| 4,106,792 | A | * | 8/1978 | Schultz | B60D 5/00 280/432 |
| 4,119,330 | A | * | 10/1978 | Capps | B62D 53/0878 188/112 R |
| 4,120,514 | A | * | 10/1978 | Sanders | B62D 53/0878 280/432 |
| 4,204,700 | A | * | 5/1980 | Haines, Sr. | B62D 53/0878 280/474 |
| 4,241,934 | A | * | 12/1980 | Buehner | B62D 53/0871 280/432 |
| 4,341,395 | A | * | 7/1982 | Miller | B62D 53/0878 340/431 |
| 4,344,640 | A | * | 8/1982 | Ratsko | B62D 47/025 280/432 |
| 4,365,685 | A | * | 12/1982 | Ratsko | B62D 13/00 180/419 |
| 4,366,966 | A | * | 1/1983 | Ratsko | B62D 47/025 280/455.1 |
| 4,402,522 | A | * | 9/1983 | Ratsko | B62D 12/00 280/455.1 |
| 4,405,145 | A | * | 9/1983 | Bergman | B62D 47/025 180/197 |
| 4,412,592 | A | * | 11/1983 | Bergman | B62D 47/025 180/197 |
| 4,438,943 | A | * | 3/1984 | Hebert | B62D 53/0878 280/455.1 |
| 4,469,347 | A | * | 9/1984 | Gier | B62D 47/025 280/455.1 |
| 4,494,765 | A | * | 1/1985 | Ratsko | B62D 47/025 280/455.1 |
| 4,556,231 | A | * | 12/1985 | Schultz | B62D 53/0871 280/474 |
| 4,585,248 | A | * | 4/1986 | Miller | B62D 53/0871 280/455.1 |
| 4,586,726 | A | * | 5/1986 | Capps | B62D 53/0885 280/433 |
| 4,620,717 | A | * | 11/1986 | Ivony | B62D 53/00 280/432 |
| 4,720,118 | A | * | 1/1988 | Schultz | B62D 47/025 280/426 |
| 4,756,543 | A | * | 7/1988 | Cromnow | B62D 53/0871 280/446.1 |
| 4,763,916 | A | * | 8/1988 | Ratsko | B62D 47/025 280/455.1 |
| 4,993,738 | A | * | 2/1991 | Bennett | B62D 53/0871 280/446.1 |
| 5,135,248 | A | * | 8/1992 | Keiserman | B62D 53/0871 280/446.1 |
| 5,232,239 | A | * | 8/1993 | Hawkins | B62D 53/0871 188/112 A |
| 5,259,640 | A | * | 11/1993 | Mackey | B62D 53/0878 280/433 |
| 5,348,331 | A | * | 9/1994 | Hawkins | B60D 1/322 280/455.1 |
| 5,456,483 | A | * | 10/1995 | Madsen | B62D 53/0871 280/446.1 |
| 5,957,476 | A | * | 9/1999 | Simpson | B62D 53/0871 280/446.1 |
| 6,260,872 | B1 | * | 7/2001 | Budhram | B62D 53/0871 280/432 |
| 6,340,167 | B1 | * | 1/2002 | Boyd | B62D 53/0871 280/474 |
| 6,714,124 | B2 | * | 3/2004 | Meyer | B62D 53/0871 200/61.44 |
| 7,156,410 | B1 | * | 1/2007 | Maskaleris | B62D 53/0878 280/433 |
| 7,175,194 | B2 | * | 2/2007 | Ball | B62D 53/0878 280/455.1 |
| 7,464,955 | B2 | * | 12/2008 | Ahlberg | B62D 53/028 280/124.112 |
| 7,703,790 | B2 | * | 4/2010 | Cunefare | B62D 53/0878 280/433 |
| 7,905,555 | B2 | * | 3/2011 | Huntimer | B60D 1/30 188/112 A |
| 2003/0067139 | A1 | * | 4/2003 | Hosmer | B62D 53/06 280/433 |
| 2012/0029782 | A1 | * | 2/2012 | Suda | B60T 8/1708 701/70 |
| 2019/0100261 | A1 | * | 4/2019 | Hansen | B60D 1/30 |
| 2021/0139090 | A1 | * | 5/2021 | Shalit | G01S 15/62 |

* cited by examiner

JACKKNIFE PREVENTION APPARATUS

PRIORITY UNDER 35 U.S.C SECTION 119(E) & 37 C.F.R. SECTION 1.78

This nonprovisional application claims priority based upon the following prior United States Provisional Patent Application entitled: Semi-Truck Jackknife Blocker, Application No.: 63/235,250 filed Aug. 20, 2021, in the name of David M. Regen, which is hereby incorporated by reference for all purposes.

FIELD OF THE INVENTION

The present invention relates generally to vehicle safety systems, more specifically but not by way of limitation, an apparatus that is integrally mounted between a tractor cab and a trailer wherein the apparatus of the present invention inhibits a particular angle between the trailer and the tractor from being exceeded so as to reduce the probability of a jackknifing situation.

BACKGROUND

A tractor-trailer rig is said to be jackknifing when the angle between the tractor and trailer increases unintentionally and undesirably. This can happen several ways. For example, the trailer's rear can swing out of line with its trajectory owing to strong side wind or to centrifugal force on the trailer's rear. Alternatively, the tractor can veer out of line with its trajectory owing to unbalanced brakes, road surface variations, hard braking during a turn and/or centrifugal force on the tractor's rear.

Millions of tractor-trailers traverse local roads and highways everyday. These vehicles can weigh up to eighty thousand pounds and often have to drive in adverse conditions. When driving in adverse conditions and even safe conditions, these tractor-trailer rigs can encounter the risk of jackknifing. Existing jackknife prevention technology is not significantly employed most likely due to the complications and cost of installing them. Some jackknife prevention systems involve alterations of tractor or trailer making one or both less compatible with conventional counterparts.

Accordingly, there is a need for a jackknife prevention system that is operable to be installed on a tractor-trailer or similar vehicle wherein the present invention is configured to be operably coupled to the tractor's frame rails behind the cab wherein the present invention includes robust structures hinged wing-like along outer edge of each frame rail and swingable on their hinges between low positions and a high position wherein in the high position the angle between the tractor and trailer is limited.

SUMMARY OF THE INVENTION

It is the object of the present invention to provide a jackknife prevention apparatus that is configured to be mounted intermediate a tractor-trailer cab and a trailer wherein the present invention includes a first jackknife blocker and a second jackknife blocker on opposing sides of a catwalk area located between a tractor-trailer cab and a trailer.

A further object of the present invention is to provide a jackknife prevention apparatus that is configured to be mounted intermediate a tractor-trailer cab and a trailer wherein the first jackknife blocker and second jackknife blocker are movable between lower positions where they do not block jackknifing and a highest position where they block jackknifing.

Another object of the present invention is to provide an apparatus that is mounted to a tractor-trailer and is operable to inhibit a certain angle therebetween wherein the first jackknife blocker and second jackknife blocker in their lowest positions constitute stairways from ground to frame-rail tops where a catwalk may be located.

Still another object of the present invention is to provide an apparatus that is mounted to a tractor-trailer and is operable to inhibit a certain angle therebetween wherein the rear faces of the first jackknife blocker and second jackknife blocker are configured to engage the trailer's leading outer corner upon the tractor-to-trailer angle achieving fifteen to twenty degrees.

An additional object of the present invention is to provide a jackknife prevention apparatus that is configured to be mounted intermediate a tractor-trailer cab and a trailer wherein the first jackknife blocker and second jackknife blocker are hingedly secured adjacent a catwalk area between a cab and a trailer.

Yet a further object of the present invention is to provide an apparatus that is mounted to a tractor-trailer and is operable to inhibit a certain angle therebetween wherein the first jackknife blocker and second jackknife blocker are movable utilizing a speed detection technique wherein the first jackknife blocker and second jackknife blocker are placed in their highest position subsequent detection of a particular speed.

Another object of the present invention is to provide a jackknife prevention apparatus that is configured to be mounted intermediate a tractor-trailer cab and a trailer wherein the first jackknife blocker and second jackknife blocker are operably coupled to a motor providing movement thereof.

Still an additional object of the present invention is to provide an apparatus that is mounted to a tractor-trailer and is operable to inhibit a certain angle therebetween wherein the motor is operably coupled to the first jackknife blocker and second jackknife blocker utilizing a movement assembly.

Yet another object of the present invention is to provide a jackknife prevention apparatus that is configured to be mounted intermediate a tractor-trailer cab and a trailer wherein the first jackknife blocker and second jackknife blocker further include impact pads secured to a portion thereof.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
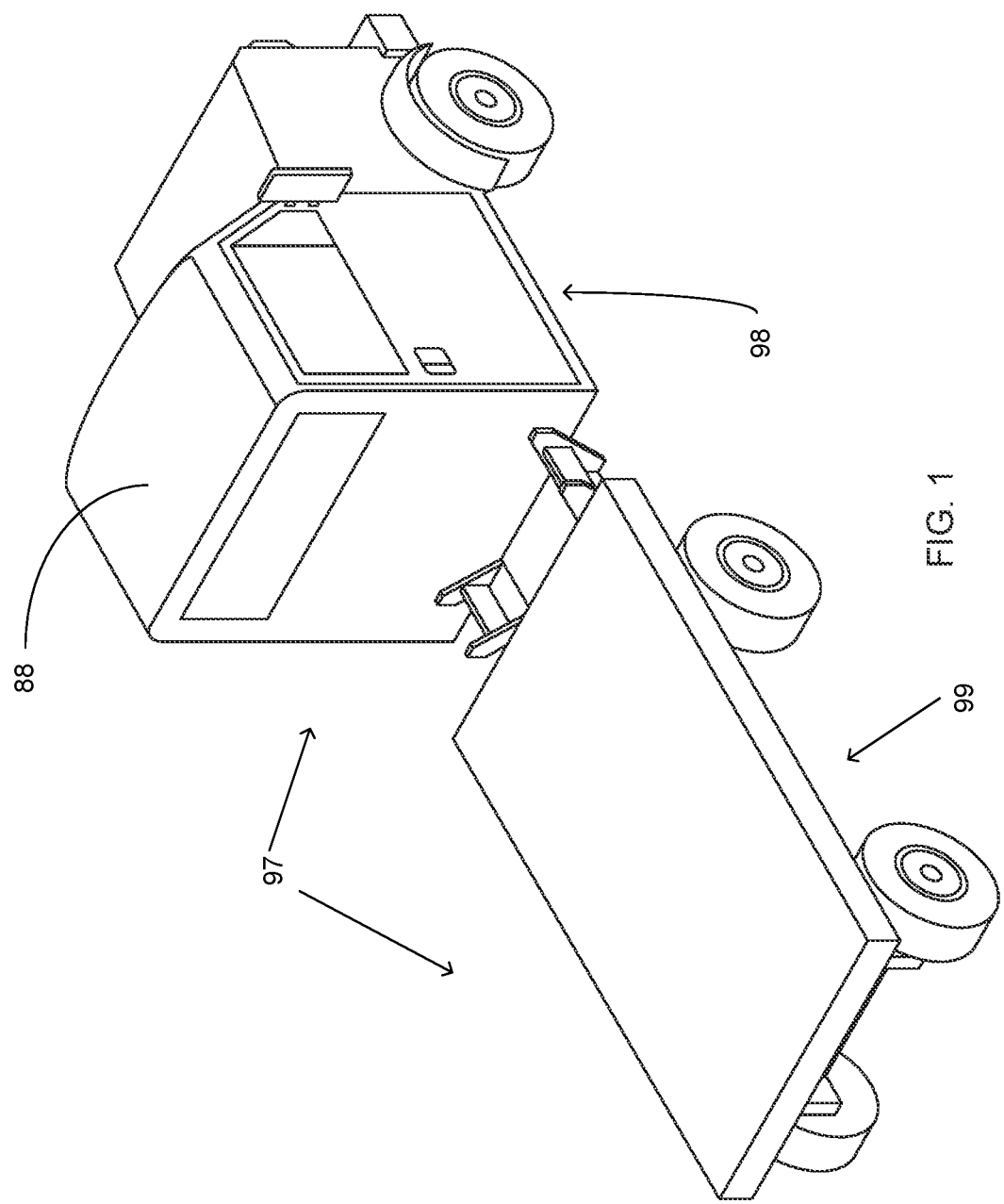
FIG. 1 is perspective view of an exemplary tractor-trailer rig with the present invention coupled thereto and in its highest position.

Referring now to the drawings submitted herewith, wherein various elements depicted therein are not necessarily drawn to scale and wherein through the views and figures like elements are referenced with identical reference numerals, there is illustrated a jackknife prevention apparatus 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Figure 2:
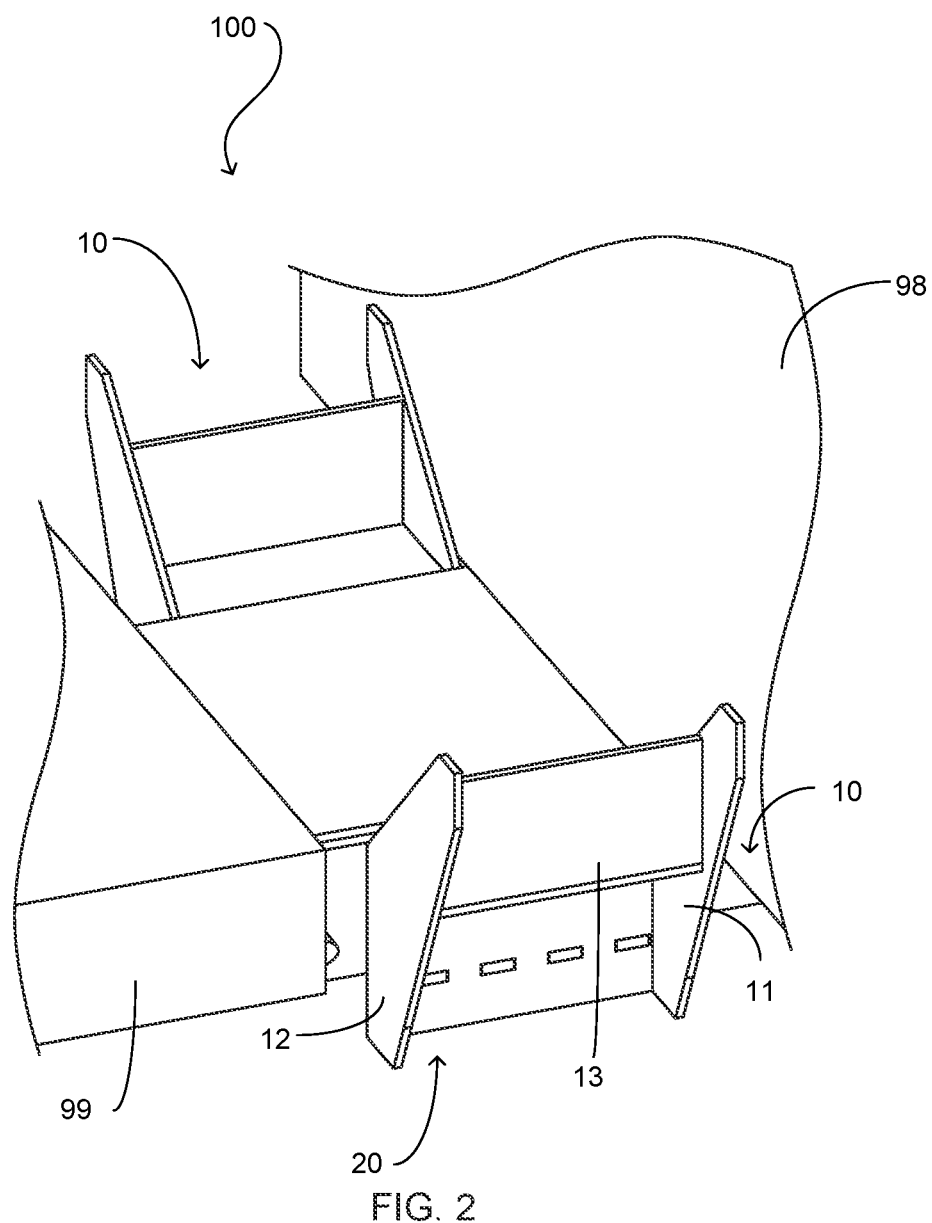
FIG. 2 is a detailed perspective view of the present invention in its highest position.
Figure 3:
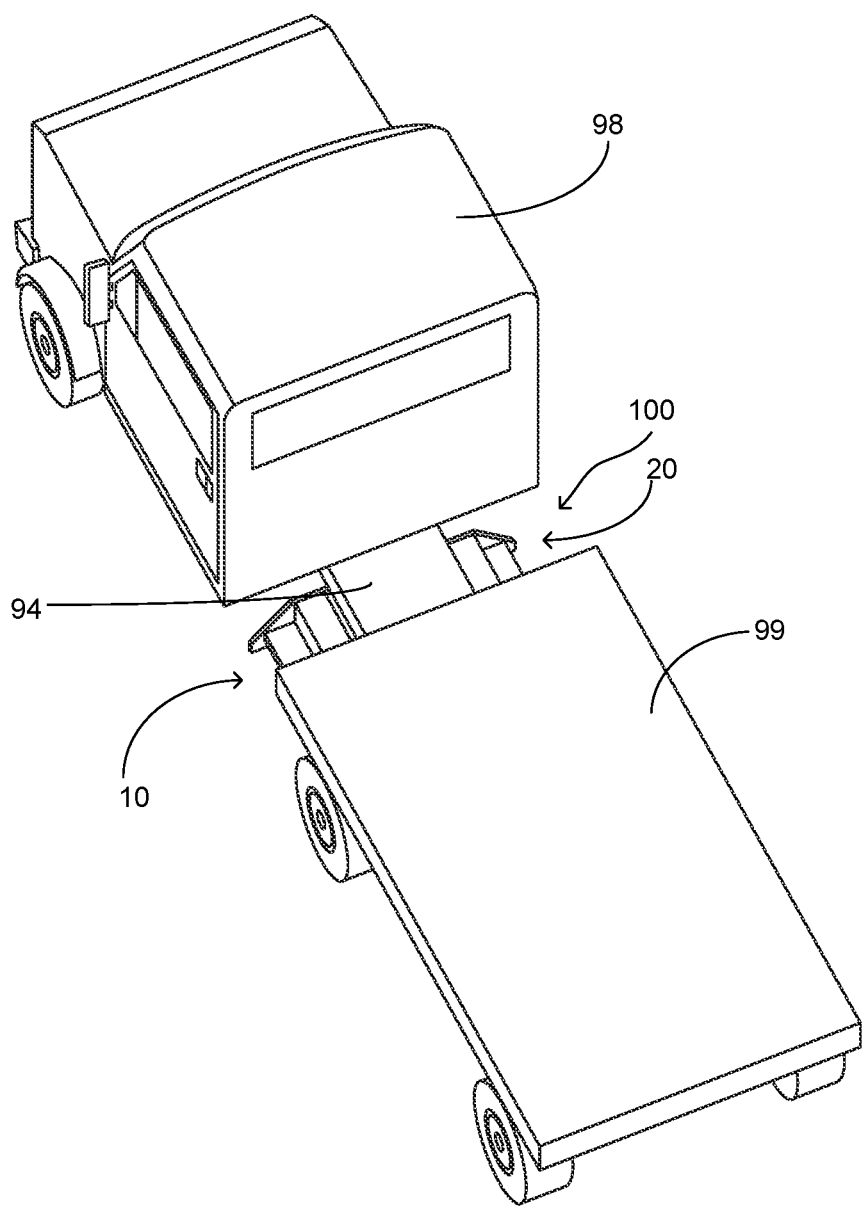
FIG. 3 is a top perspective view of the present invention on an exemplary tractor-trailer rig wherein the present invention is in its lowest position, where it constitutes a stairway.
Figure 4:
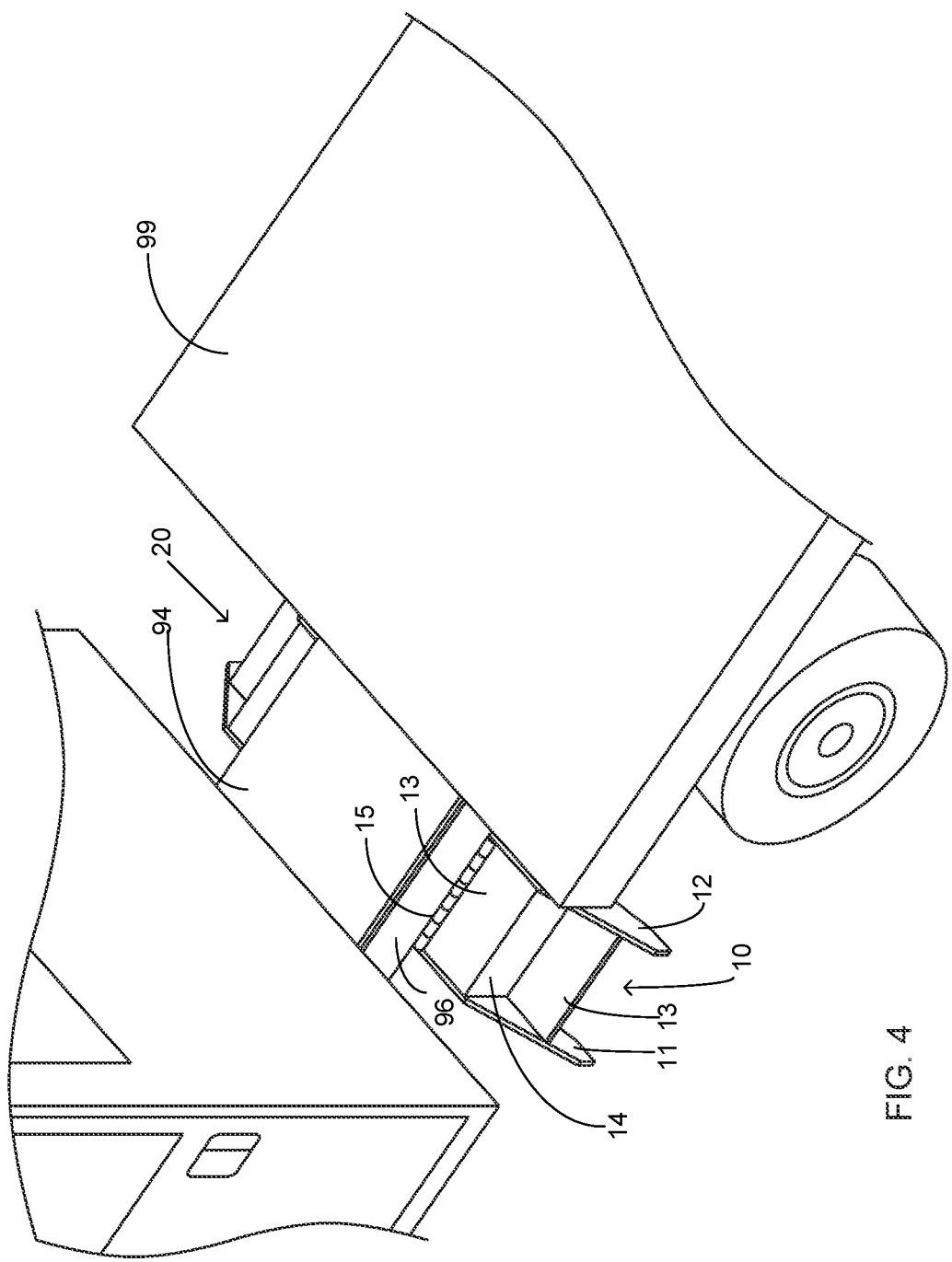
FIG. 4 is a detailed perspective view of the present invention in its lowest position.
Figure 5:
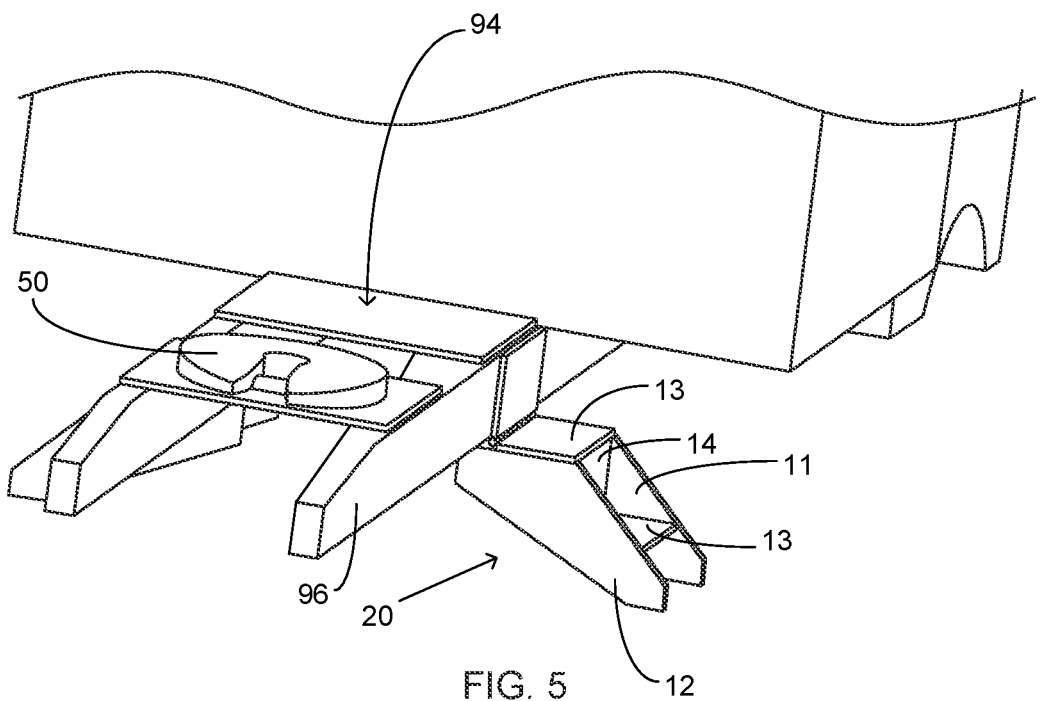
FIG. 5 is a detailed view of the mounting location of the present invention on a tractor's exposed frame rails.
Figure 6:
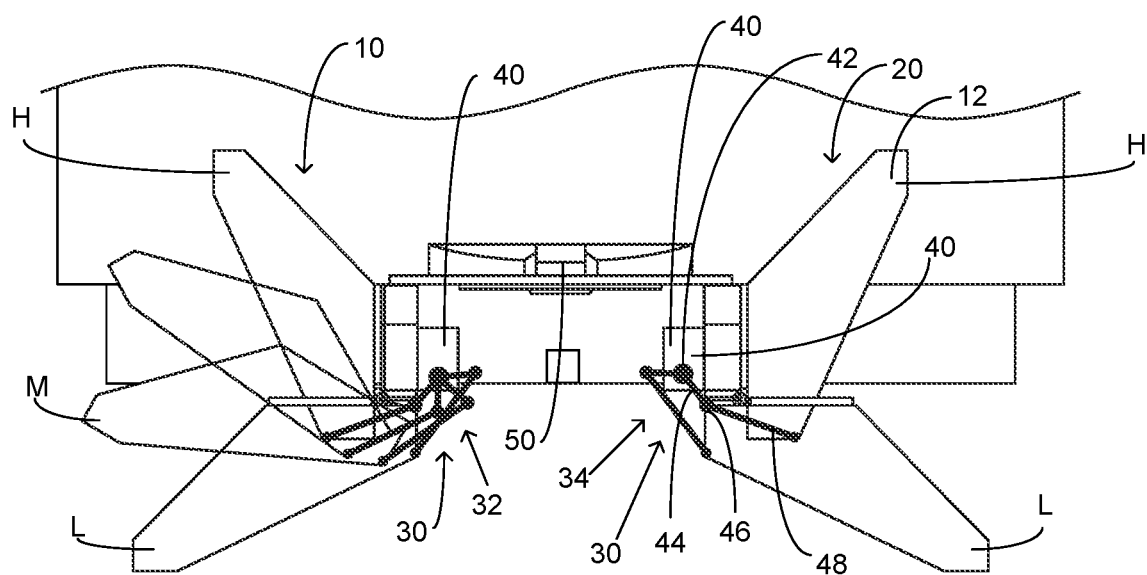
FIG. 6 is a detailed end view of the present invention and its movement assembly with exemplary positions.
Figure 7:
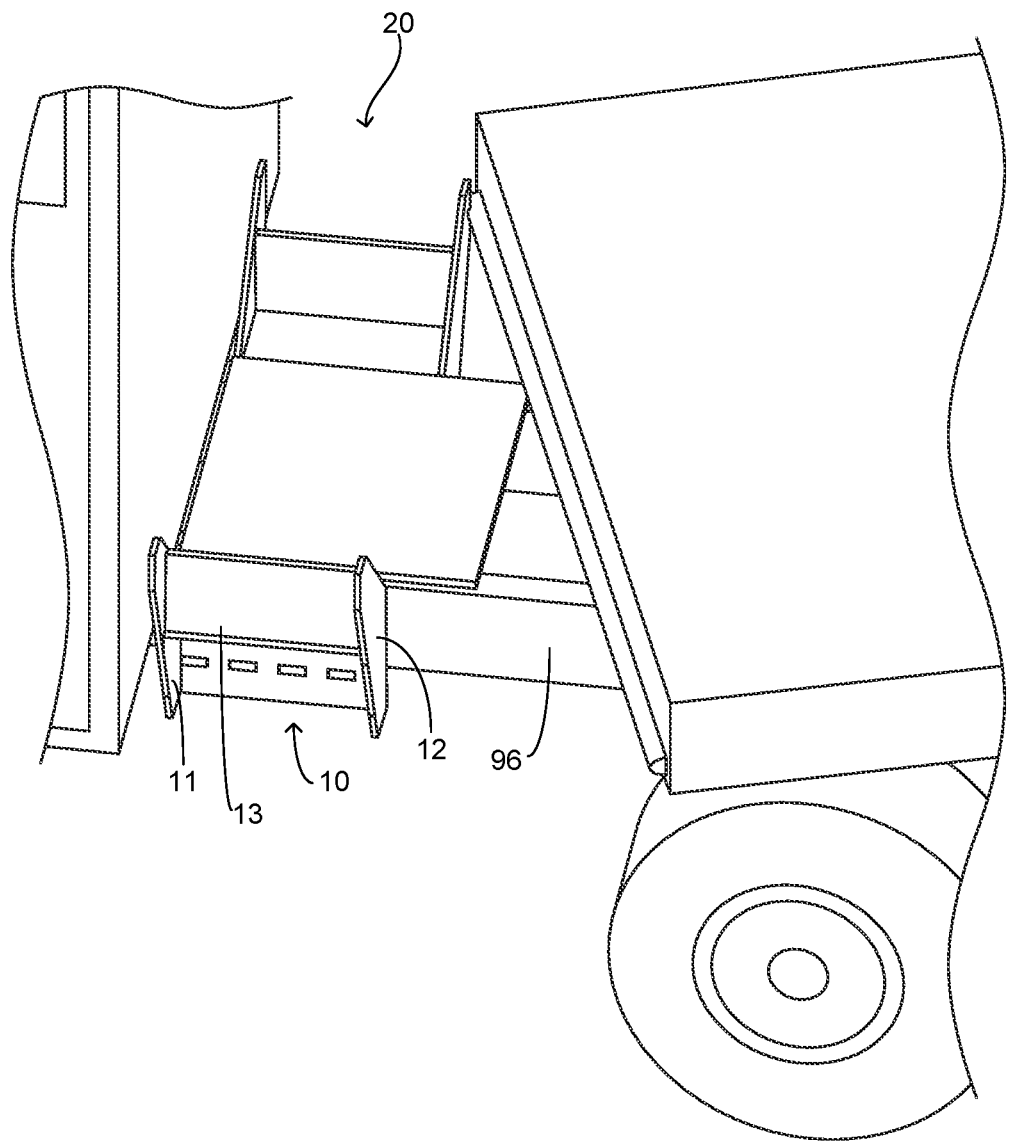
FIG. 7 is a detailed view of the present invention in its highest position engaged with an exemplary trailer limiting the angle achievable thereof with respect to the tractor.

Referring in particular to the Figures submitted as a part hereof, the jackknife prevention apparatus 100 includes two jackknife blockers 10,20 behind the tractor's cab 88 and in front of the trailer 99, each of them attached by hinge to and extending laterally from a respective frame rail 96 left or right. The jackknife blockers, hinges and fasteners are of metal robust enough to withstand expected forces. The jackknife blockers can swing wing-like on their hinges. down to and dwell in their lowest position as shown in FIGS. 3, 4 and 5; and they can swing up to and dwell in their highest position as shown in FIGS. 1, 2 and 7; and they can swing to and dwell in a mid-position (FIG. 6, M). The jackknife blockers move from mid position to highest position when tractor speed rises above for example 30 miles per hour. The jackknife blockers return to mid-position when tractor speed falls below for example 25 miles per hour. In their highest position, the jackknife blockers limit the range of angles between tractor 98 and trailer 99 to safe values, for example less than 15 degrees from aligned. A jackknife blocker 10 or 20 will bump into one of the trailer's bottom-front corners when a limiting angle is reached, as depicted in FIG. 7. This limitation of the tractor-trailer angle prevents jackknifing of the tractor-trailer rig 97. In their mid-position the jackknife blockers do nothing but wait either for higher tractor speeds to evoke swinging up to a highest position (FIGS. 1, 2, 7) or for tractor parking to evoke swinging down to a lowest position (FIGS. 3, 4, 5).

Within the scope of the present invention are other jackknife-blocker features compatible with positioning of well braced, frame-rail-attached metal plates reversibly in the way of a trailer's lower-front corners so as to limit tractor-trailer angles as depicted in FIG. 7 when tractor speeds are sufficient for jackknifing to be dangerous. The embodiment presented here in detail has the advantage of serving a second purpose when the tractor is parked, that of providing a stairway between ground and the area above the frame rails where a nonskid catwalk is typically found. As shown in FIGS. 3, 4 and 5, each jackknife blocker in its lowest position exhibits typical stairway elements: two stringers 11,12, at least two treads 13 and at least one riser 14. It can be appreciated that this arrangement of stairway elements welded to adjacent stairway elements provides excellent rigidity of a jackknife blocker relative to its weight. Within the scope of this invention, other jackknife-blocker shapes are contemplated, for example other hinge positions, other ways of bracing the trailer-engaging metal plate 12.

Any of several means of raising and lowering the jackknife blockers 10, 20 could be employed. For example, each jackknife blocker could be lifted and positioned by a cable or chain from a spool or pulley or lever mounted on the back of the cab, a left one for the left jackknife blocker 10 and a right one for the right jackknife blocker 20 or a central one linked to both jackknife blockers. Alternatively, each jackknife blocker could be positioned by a pneumatic cylinder mounted on the back of the cab, a left cylinder for the left jackknife blocker 10. and a right cylinder for the right jackknife blocker 20 or a central cylinder linked to both jackknife blockers.

It may be desirable to raise and lower the jackknife blockers 10, 20 by devices that are out of view and hard to reach. Components and actions of one such arrangement are illustrated in FIG. 6. It includes two movement assemblies 30, each having a motor 40 mounted medial to a respective frame rail in a location where its output linkages 42, 44, 46, 48 can meet its respective rear stringer 12. The components and actions are bilaterally symmetrical, but the left side of the drawing is to illustrate geometry of linkage and jackknife blocker between lowest position L and highest position H, with two intermediate positions, one of which M is maintained during slow-speed driving. The right side of the drawing is to display details of the motor-to-blocker linkage: a hub 42 on the motor shaft connected to a first arm member 44 connected to an elbow knuckle 46 connected to a second arm member 48 connected by a pin to a specific corner of a rear stringer 12. Looking at the left side, one can sense the motion of the linkage and jackknife blocker together. All linkage components must be of stiff and resilient metal.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A semi-truck jackknife blocker comprising a braced steel plate protruding laterally from each frame rail of a semi-truck tractor, said jackknife blocker being hingedly attached to each frame rail and movable between high and low positions, said jackknife blocker being moved to the highest position when the tractor is traveling above a predetermined speed at which position the jackknife blocker blocks approach of either trailer's lower-front corner toward the tractor's cab thereby limiting tractor-trailer angles, said jackknife blocker being moved to lower positions where the jackknife blocker does not limit tractor-trailer angle when the tractor is traveling below a predetermined speed; wherein said braced steel plate constitutes a first stringer of a stairway, treads, risers and a second stringer of said stairway wherein the first stringer and second stringer are braces of the jackknife blocker, wherein a top tread or a top riser of said stairway being hinged to an outer edge of the tractor's frame rail between the cab and the trailer, the jackknife blocker in the lowest position providing a stairway from ground to frame rail tops providing secure footing and wherein the jackknife blocker is connected to a motor that automatically places the jackknife blocker in a low position, a mid-position and a high position as needed for safety, operation and convenience, said jackknife blocker moving to the low position and remaining in the low position when the tractor is parked, said jackknife blocker being moved to the mid-position when the tractor is moving below a predetermined speed, said jackknife blocker being moved to the high position when the tractor is traveling above 30 miles per hour.

\* \* \* \* \*